United States Patent [19]

Tower

[11] Patent Number: 4,514,821
[45] Date of Patent: Apr. 30, 1985

[54] ELECTRO-OPTICAL CCD TRANSVERSAL FILTER WITH ANALOG REFERENCE WEIGHTS

[75] Inventor: John R. Tower, West Deptford, N.J.

[73] Assignee: RCA Corporation, Princeton, N.J.

[21] Appl. No.: 424,231

[22] Filed: Sep. 27, 1982

[51] Int. Cl.³ .............................................. G06G 7/19
[52] U.S. Cl. .................................... 364/862; 364/825; 364/724
[58] Field of Search ............... 364/862, 819, 728, 822, 364/724, 825; 382/42

[56] References Cited

U.S. PATENT DOCUMENTS

| | | | |
|---|---|---|---|
| 4,011,441 | 3/1977 | Michon et al. | 364/862 |
| 4,045,795 | 8/1977 | Fletcher et al. | 364/862 |
| 4,103,333 | 7/1978 | Poirier et al. | 364/862 |
| 4,132,989 | 1/1979 | Arens | 364/728 |
| 4,244,029 | 1/1981 | Hogan et al. | 382/42 |
| 4,366,503 | 12/1982 | Terakawa et al. | 364/862 |

OTHER PUBLICATIONS

Parrish, Jr. et al., "Implications of Charge-Coupled Devices for Pattern Recognition", IEEE Transactions on Computers, Nov. 1976, pp. 1146–1152.

Tiemann et al., "Charge-Coupled Devices and Applications", IEEE International Solid-State Circuits Conference, 1974, pp. 154–155.

Theunissen, "Charge Transfer Devices", Microelectronique, vol. 54, No. 8, 1974, pp. 405–413.

Evans et al., "An Investigation Into the Use of Intracell CCDs for Analogue and Digital Signal Processing", Solid-State & Electron Devices, vol. 2, No. 6, 1978, pp. 215–13.

Primary Examiner—Joseph Ruggiero
Assistant Examiner—Gary V. Harkcom
Attorney, Agent, or Firm—Joseph Tripoli; George E. Haas; George J. Seligsohn

[57] ABSTRACT

The respective pixel stages of an electro-optical transversal filter may be intimately associated with corresponding stages of a CCD shift register means in a monolithic structure on an integrated chip. The shift register means, which operates to forward a preselected one of a set of analog reference weights to each of the transversal filter pixel stages, permits the transversal filter to be used in an electro-optical correlation means having a very high effective computation rate.

12 Claims, 9 Drawing Figures

ELECTRO-OPTICAL CCD TRANSVERSAL FILTER WITH ANALOG REFERENCE WEIGHTS

This invention relates to an electro-optical charge coupled device (CCD) transversal filter with analog reference weights, which makes possible an improved electro-optical correlation means.

Electro-optical correlation means are useful in optical character recognition systems (OCR), military tracking systems employing template cross-correlation techniques and other systems which require that a pattern formed by an optical image be correlated with a reference pattern. Typically, in the prior art, an optical filter defining the reference pattern is situated in front of an imager, and a radiant-energy image pattern from an image source is projected on the imager through the optical filter. This results in each picture element (pixel) of the imager being illuminated by the product of the corresponding pixels of the radiant-energy image pattern and the reference pattern. An integrator, which sums the respective imager pixel signals, provides a correlation output.

The present invention teaches a monolithic electro-optical CCD transversal filter and analog reference weight CCD shift register means on an integrated circuit chip that can be used to provide a correlation output by subtracting a summation signal derived on a $\Sigma^-$ bus of the transversal filter from a summation signal derived on a $\Sigma^+$ bus of the transversal filter.

Figure 1:
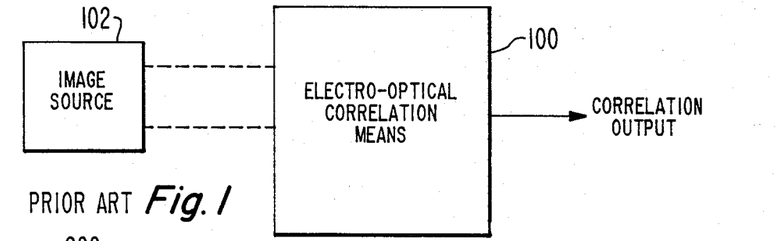
FIG. 1 is a block diagram of the combination of an electro-optical correlation means and an image source, which combination is known in the prior art.

FIG. 1 shows an electro-optical correlation means 100, which when illuminated by an image from image source 102, derives a correlation output. As is known in the prior art, image source 102 may be a picture projector, a real-time modulated flying spot (such as may be obtained by scanning a beam of modulated pulses) from an LED—i.e., light-emitting diode, or a one or two-dimensional array of individually controlled LED's. In any case, image source 102 generates a radiant energy image, (e.g., visible light or infrared light), which is incident on a one or two-dimensional photo-sensing imager forming part electro-optical correlation means 100. As is known in the art, electro-optical correlation means 100 is capable of correlating the pattern of image source 102 with a reference pattern internal to electro-optical correlation means 100, with the correlation output from electro-optical correlation means 100 defining the amount of correlation between the image pattern and the reference pattern.

Figure 2:
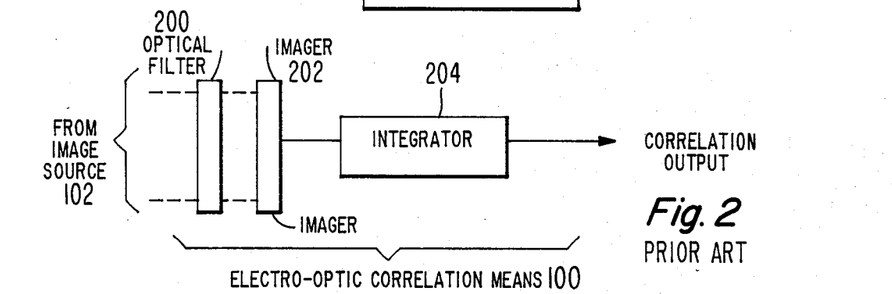
FIG. 2 is a block diagram of an embodiment of a prior art electro-optical correlation means.

FIG. 2 shows a typical prior art implementation of electro-optical correlation means 100. As shown in FIG. 2, the image from image source 102 must pass through optical filter 200 to reach imager 202. Although optical filter 200 may be any form of optical filter, a particularly suitable form of optical filter employed by the prior art consists of a one or two-dimensional pattern of pixel apertures having a range of transmissivities, which, for example, may be provided by a liquid crystal display. The imager 202 may be any form of imager. A particularly suitable form of imager is a one or two-dimensional charge coupled device (CCD) imager capable of shifting out in sequence the respective photo charges generated in each pixel stage thereof to the input of integrator 204. In this case, each aperture of the liquid crystal display corresponds to a separate one of the pixel stages of the CCD imager. It follows that the radiant energy incident on any pixel stage of imager 202 is proportional to the product of the intensity of the radiant energy in the corresponding image pixel from imager source 102 and the transmissivity of the corresponding aperture of optical filter 200. Integrator 204 operates to sum up all of the pixel photo charges of imager 202, thereby to provide a correlation output from the embodiment of the prior art electro-optical correlation means 100 shown in FIG. 2.

It is plain from the above discussion of FIG. 2 that (1) that optical filter 200 and imager 202 is comprised of separate structures employing separate technologies (i.e., optical filter 200 is a one or two-dimensional array of liquid crystal display apertures, while imager 202 is a corresponding array of CCD pixel stages, which must be situated in properly aligned cooperative spatial relationship with one another), and (2) in the usual case, in which imager 202 is a two-dimensional array comprised of a large number (e.g., many tens of thousands or more) of CCD pixel stages, the time (normally about 1/60 of a second) required to shift out the entire field of pixel charges from imager 202 into the input of integrator 204 is relatively long. The disadvantages relating to both (1) and (2), discussed in the preceding sentence, of the prior art electro-optical correlation means 100 shown in FIG. 2, are eliminated by an implementation of electro-optical correlation means 100 incorporating the principles of the present invention.

Figure 3:
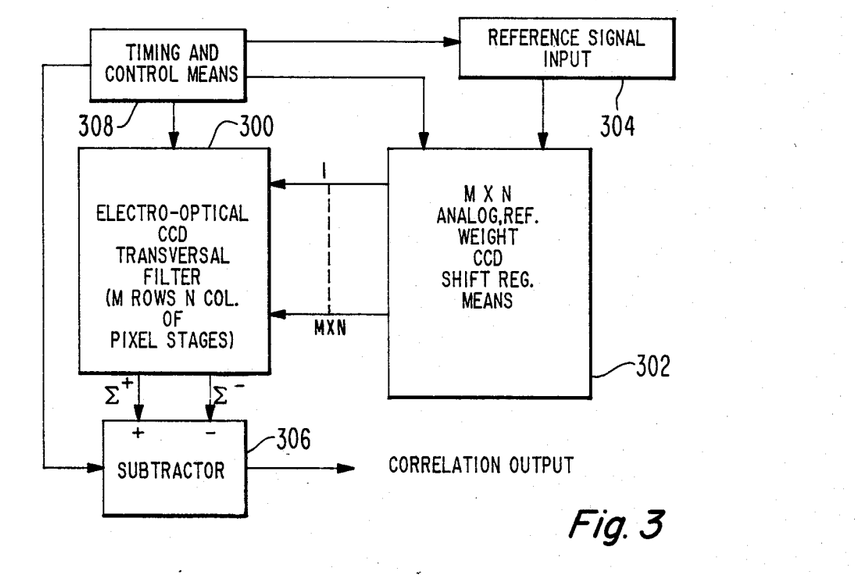
FIG. 3 is a functional block diagram of an electro-optical correlation means incorporating the principles of the present invention.

FIG. 3 is a functional diagram of an illustrative embodiment of the present invention. In FIG. 3, Electro-optical CCD Transversal Filter 300 is comprised of a two-dimensional array of pixel stages arranged in M rows and N columns (where each of M and N is a plural integer). However, it should be understood that the present invention applies with equal force to an electro-optical CCD transversal filter comprised of a one-dimensional array of pixel stages. M×N Analog Reference Weight CCD Shift Register Means 302, which receives reference signals from Reference Signal Input 304, includes a separate one of its M×N shift register stages associated with a corresponding one of the M×N pixel stages of Transversal Filter 300 for selectively controlling the analog reference weight assigned to each of the respective pixel stages of the array of Transversal Filter 300. Transversal Filter 300 includes a Σ+ output and a Σ− bus output which are coupled respectively to the + and to the − inputs of Subtractor 306. Subtractor 306 produces a correlation output which is proportional to the difference between the two inputs thereto. The Transversal Filter 300, Shift Register Means 302, Reference Signal Input 304 and Subtractor 306 are controlled by control signals applied thereto from Timing and Control Means 308.

Figures 4, 9:
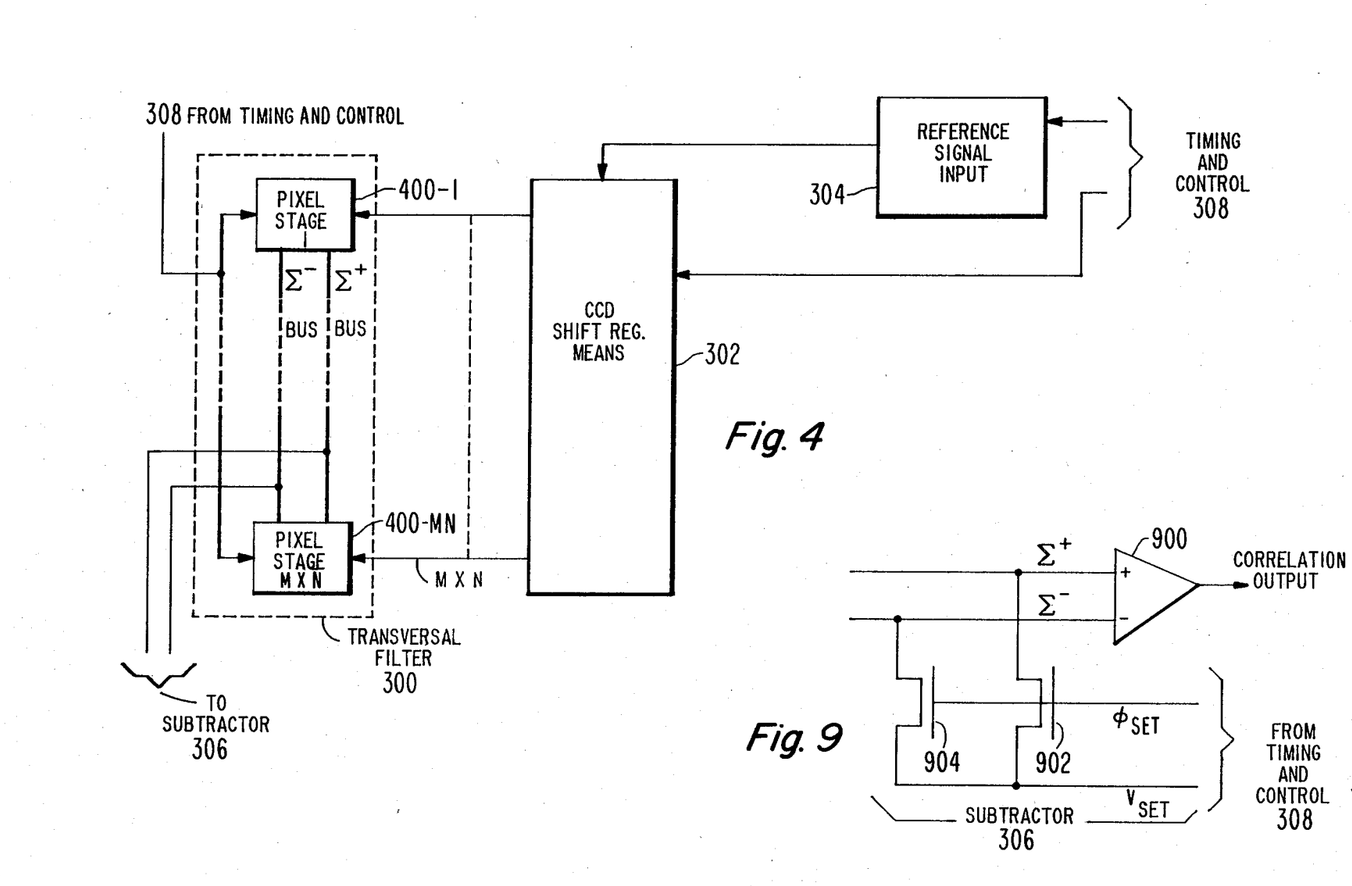
FIG. 4 is a block diagram which illustrates the respective pixel stages of the CCD transversal filter of FIG. 3 and shows the manner in which they are associated with the corresponding CCD shift register stages of the shift register means of FIG. 3.
FIG. 9 is a schematic showing of an embodiment the subtractor of FIG. 3.

FIG. 4 shows Transversal Filter 300 in more detail. Specifically, Transversal Filter 300 is comprised of M×N pixel stages 400-1 ... 400-MN, each of which has a separate reference weight applied thereto from CCD Shift Register Means 302. As shown, the Σ+ bus and the Σ− bus are both common to all of the pixel stages 400-1 ... 400-MN. Further, each of the individual pixel stages 400-1 ... 400-MN is controlled by control signals from Timing and Control Means 308.

Figure 5:
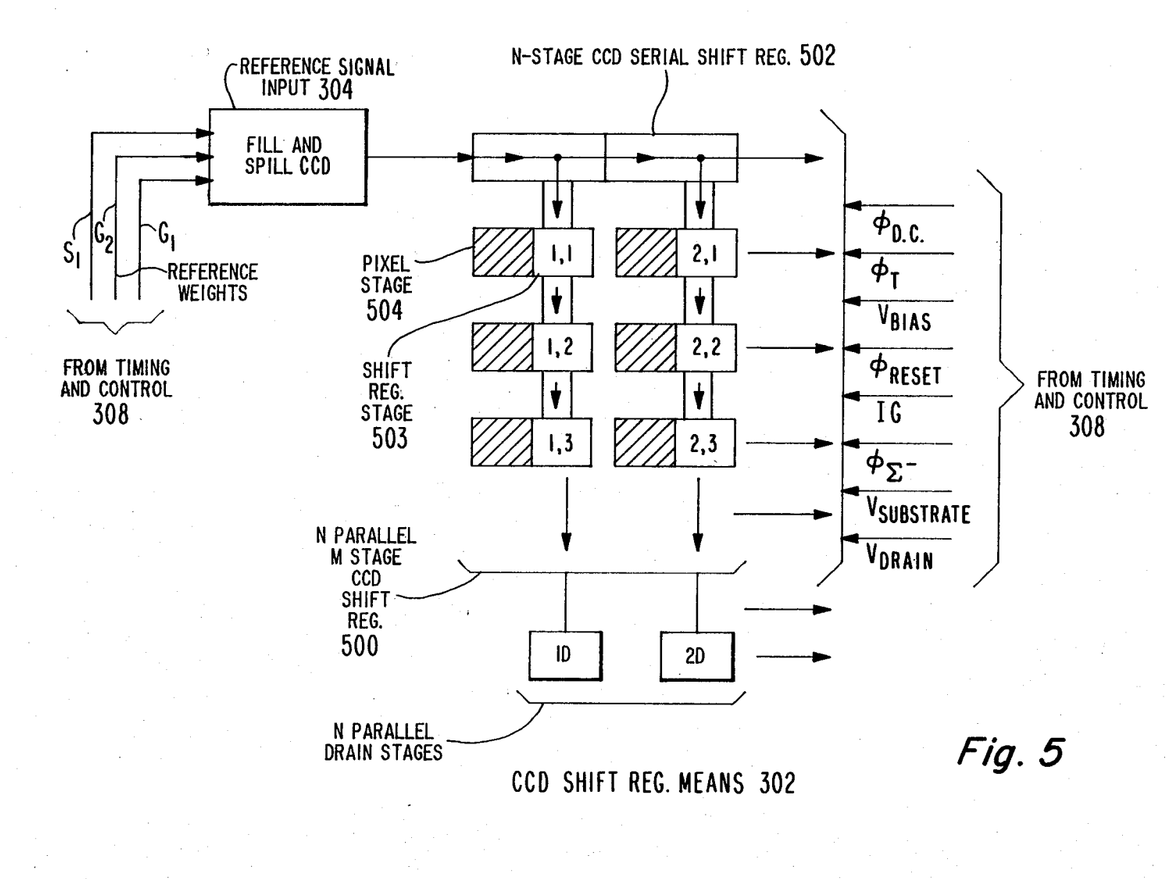
FIG. 5 illustrates the monolithic association of the shift register stages of the CCD shift register means of FIGS. 3 and 4 with the corresponding CCD transversal-filter pixel stages of FIG. 4, together with the nature of the reference signal input of FIGS. 3 and 4 and the specific timing and control signals supplied from the timing and control means of FIG. 3.

The respective pixel stages 400-1 ... 400-MN of Transversal Filter 300, the individual shift register stages of Shift Register Means 302 and Reference Signal Input 304 are all part of a single CCD monolithic structure on an integrated chip. As shown schematically in FIG. 5, CCD Shift Register Means 302 is comprised of N parallel M-stage CCD shift registers 500 in cooperative relationship with a single N-stage CCD serial shift register 502. Physically contiguous with each individual stage 503 of each of the N parallel M-stage CCD shift registers 500 is a corresponding pixel stage 504 (shown in cross hatch) of Transversal Filter 300. Reference Signal Input 304 is comprised of a fill-and-spill CCD source (which, per se, is known in the art) of analog reference weight charges, which, under the control of Timing and Control Means 308, may be applied as an input to N-stage CCD serial shift register 502. As indicated in FIG. 5, the last (i.e., the Mth) stage of each of the N parallel M-stage CCD shift registers 500 is applied to an individual drain (e.g., drains 1D ... ND) associated with the corresponding one of the N parallel M-stage CCD shift registers 500. FIG. 5 also schematically shows the identity of the control signals from Timing and Control Means 308 which are applied to the monolithic structure comprised of CCD Shift Register means 302, the corresponding pixel stages 504 of Transversal Filter 300 and to reference fill-and-spill CCD Reference Signal Input 304. In particular, fill-and-spill CCD Reference Signal Input 304 receives from Timing and Control Means 308 a source control signal $S_1$, a first gate signal $G_1$ and a second gate signal $G_2$, the voltage level of $G_2$ varying for each successive reference signal input to provide preselected analog reference weights defining a reference pattern to each of the pixel stages 504 of Transversal Filter 300, which preselected reference weights may be stored in digital form in a read-only memory within Timing and Control Means 308. In this case, Timing and Control Means 308 includes a digital-to-analog converter to provide the reference weights in analog form. Timing and Control Means 308 also supplies control signals $\phi_{DC}$, $\phi_T$, $\phi_{reset}$ and $\phi_\Sigma-$ to gate electrodes of Shift Register Means 302 and of pixel stages 504. Timing and Control means 308 further applies additional control voltages $V_{bias}$, $V_{substrate}$, $V_{drain}$ and IG to various portions of the monolithic structure forming CCD shift register means 302 and pixel stages 504 of Transversal Filter 300.

CCD shift register structures of a type comprising a serial shift register feeding a plurality of parallel shift registers, are known in the art and are employed in uniphase CCD shift registers (e.g., RCA TC 1235, and Fairchild 500 stage tapped delay line) employed in the serial-parallel (SP) portion of the well-known SPS memory architecture. A more detailed description of the structure and operation of each stage of CCD Shift Register Means 302 is given below in connection with FIG. 8.

At this time, all that need be said is that each stage of CCD serial shift register 502 is first serially loaded with a row of analog reference weights which are serially inputted thereto from Reference Signal Input 304. Then, the N parallel M-stage CCD shift registers 500 are operated in parallel to shift that entire row of reference signal analog weights to the bottom (i.e., the MNth) row thereof). The whole process is repeated for the (MN-1) row, etc., so that, finally, every shift register stage 503 of the N parallel M-stage CCD shift registers is loaded with the proper analog reference weight for the individual pixel stage 504 associated therewith. Further, the loading of the bottom (i.e., MNth) row results in any previous reference analog weight charges stored in the CCD shift register stages of shift registers 500 being shifted out, a row at a time, into the row of drains 1D ... ND.

Figure 6:
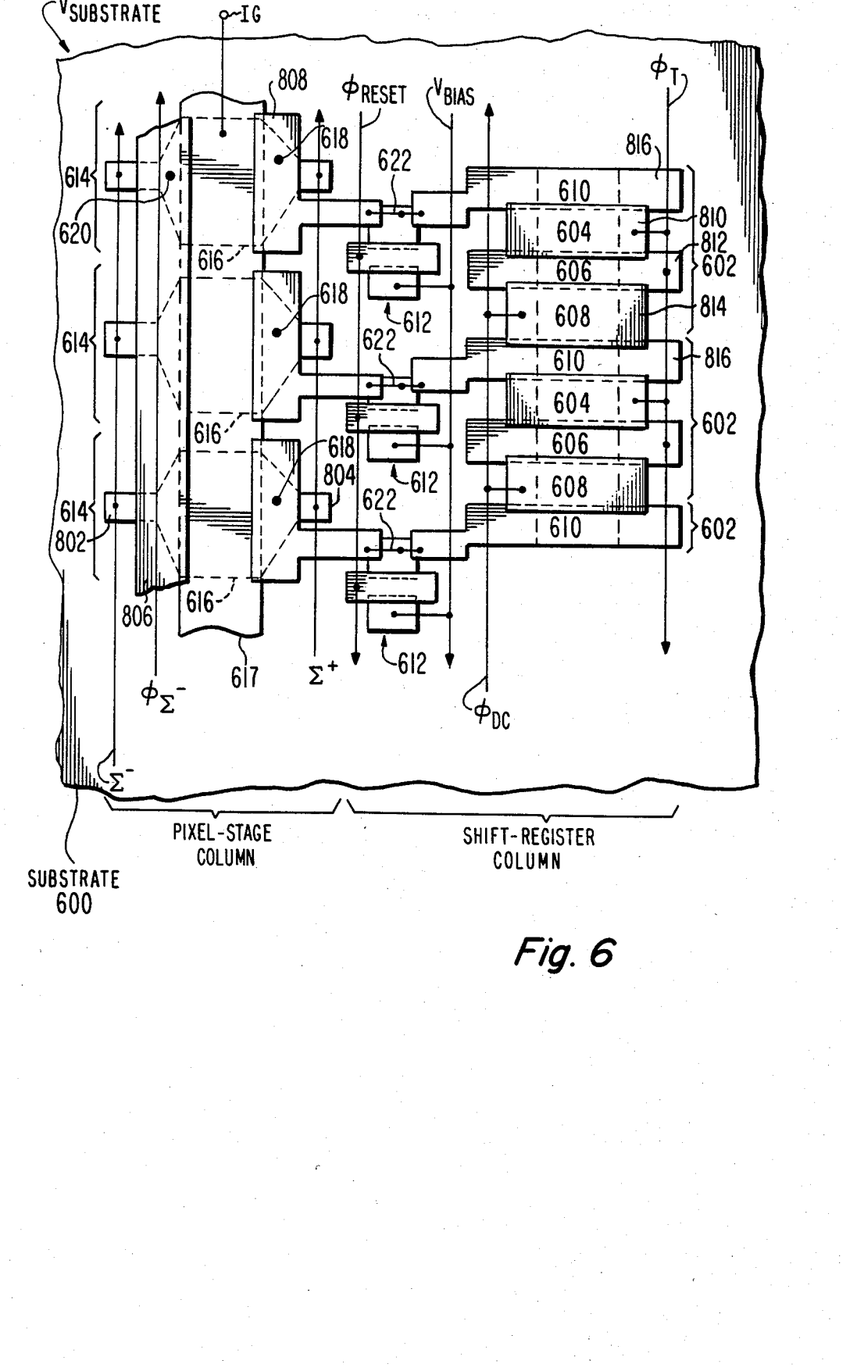
FIG. 6 is a plan view of the structural layout of a pixel stage column and of a shift register column of an integrated circuit of any one of the pixel stage columns and shift register columns shown in FIG. 5.

FIG. 6 illustrates the layout on the substrate of a silicon chip of a few of the pixel stages 504 and the corresponding shift register stages of any one of the N parallel M-stage CCD shift registers 500. In the following description, it is assumed for illustrative purposes that this silicon chip substrate is of P conductivity with N conductivity diffusions. For a chip substrate of opposite conductivity, the potential polarities set forth below should be reversed. As shown in FIG. 6, chip substrate 600 is maintained at the potential level of $V_{substrate}$ (which is normally ground or slightly negative). The structure shown in FIG. 6 employs two levels of polysilicon electrodes on the substrate surface. More specifically, each CCD shift register stage 602 (shown in more detail in FIG. 8) is comprised of gate electrodes 604 and 606 both of which are connected to the uniphase clock voltage $\phi_T$ bus, gate electrode 608 which is connected to the $\phi_{DC}$ bus, and floating gate electrode 610. Each shift register stage 602 further includes an NMOS reset FET 612 under control of a $\phi_{RESET}$ supplied over a bus to the gate electrode of the FET 612 for that shift register stage 602. While each of the analog reference weights is being shifted into its proper shift register 602 (in response to uniphase clock voltage $\phi_T$) during each photo-charge integration period, the level of $\phi_{RESET}$ is such as to maintain the FET 612 of each shift register stage 602 conducting, so that the voltage $V_{BIAS}$ (applied over a bus to every FET 612) is forwarded to the floating gate electrode 610 of each shift register stage 602.

Each pixel stage 614 (shown in more detail in FIG. 8) is comprised of an imager pixel 616 covered by integration gate 617, which operates as an exposure control in accordance with the level of the IG signal applied thereto from Timing and Control Means 308. Each pixel stage 614 further includes $\Sigma+$ control gate means 618 comprised of gate electrode 808 (shown in more detail in FIG. 8) for controlling the transfer of charge between the imager pixel 616 of that pixel stage 614 and a common $\Sigma+$ bus. Similarly, each pixel stage 614 further includes 620 a common $\Sigma-$ control gate means 620 including gate electrode 806 situated between the imager pixel 616 of that pixel stage 614 and a substrate diffusion 802 leading to a common $\Sigma-$ bus. Each gate electrode 808 forming the $\Sigma+$ control gate means 618 of each pixel stage 614 is permanently connected by strap connection 622 to a corresponding floating gate electrode 610 of shift register stage 602 associated with that pixel stage 614. The control electrode 806 of a common $\Sigma-$ control gate means 620 of all of the pixel stages 614 is connected to a common $\phi_{\Sigma-}$ bus.

Figure 7:
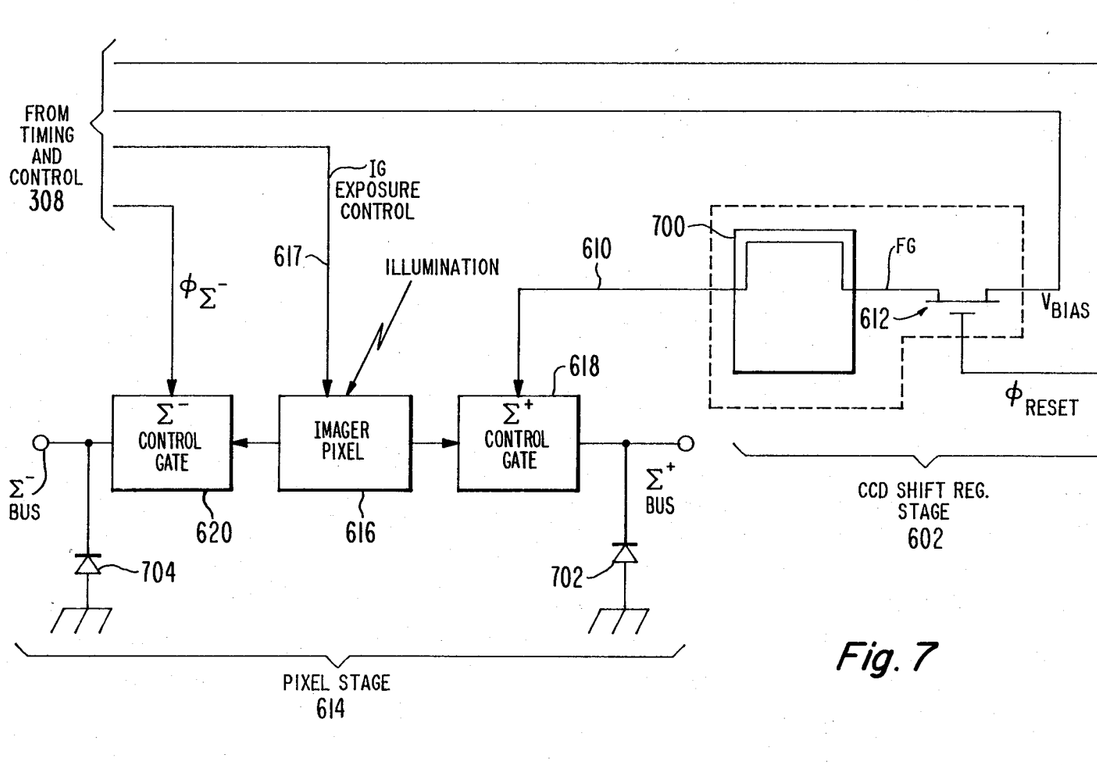
FIG. 7 is a functional block diagram of a single pixel stage and its corresponding CCD shift register stage, illustrating the control thereof by specific timing and control signals from the timing and control means of FIG. 3.

FIG. 7 is a functional block diagram of a combination of a pixel stage 614 with its associated CCD shift register stage 602. FIG. 7 assumes that the CCD shift register has already been operated, in the manner described above, to load each of CCD shift register stages 602 with its appropriate preselected analog reference weight charge 700 during the preceding photo-charge integration time period (during which time period the level of $\phi_{RESET}$ was such as to maintain FET 612 conductive, thereby maintaining the floating gate FG 610 at the level of $V_{BIAS}$). The level of $V_{BIAS}$ is such that a potential barrier formed beneath gate electrode 808 maintains $\Sigma+$ control gate 618 means closed so long as FET 612 is conductive. The level of $\phi_{\Sigma-}$ during the integration time period is such that a potential barrier in the substrate beneath the gate electrode 806 maintains $\Sigma-$ control gate 620 closed. Therefore, during the integration time period, imager pixel 616 is decoupled from both the $\Sigma+$ bus and the $\Sigma-$ bus of all the pixel stages 614.

At the end of an integration time period, a pulse of given duration is applied to $\phi_{RESET}$ by Timing and Control 308. The level of the $\phi_{RESET}$ pulse is sufficient to render FET 612 non-conductive, thereby removing $V_{BIAS}$ from floating gate FG 610 and permitting the voltage level of floating gate FG 610 of each particular CCD shift register stage 602 to assume a value determined by the amount of analog reference weight charge that is stored and then shifted in that CCD shift register stage 602. This results in control gate means 618 (which is an analog gate) being opened (a conductive channel forms beneath gate 808 thereof) to an extent determined by the then-existing potential level of floating gate FG 610 (i.e., by an amount proportional to the analog reference weight charge 700 that is then stored and shifted by that particular CCD stage 602). The opening of $\Sigma+$ control gate means 618 permits a fractional amount of the image charge stored by imager pixel 616 of each pixel stage 614 to discharge into the common $\Sigma+$ bus, which fractional amount is determined by the amount by which the total charge stored by that particular imager pixel 616 during the preceding integration time period exceeds an adjustable threshold level that varies in accordance with the extent to which the $\Sigma+$ control gate means 618 is opened by the potential level of the analog reference weight applied thereto by floating gate FG 610. Thereafter, Timing and Control 308 applies a pulse to the common $\phi_{\Sigma-}$ bus connected to the common $\Sigma-$ control gate means 620 of all the pixel stages 614. The level of the $\phi_{\Sigma-}$ pulse is sufficient to open the $\Sigma-$ control gate means 620 of all the pixel stages 614 completely, thereby to permit all of the remaining photo-charge still stored by the imager pixel 616 of each pixel stage 614 to be discharged to the $\Sigma-$ bus.

Respective diodes 702 and 704 are effective in clamping the $\Sigma+$ bus and the $\Sigma-$ bus to the substrate potential (usually ground), so that the $\Sigma+$ bus and the $\Sigma-$ buses can never assume a negative potential.

Figure 8:
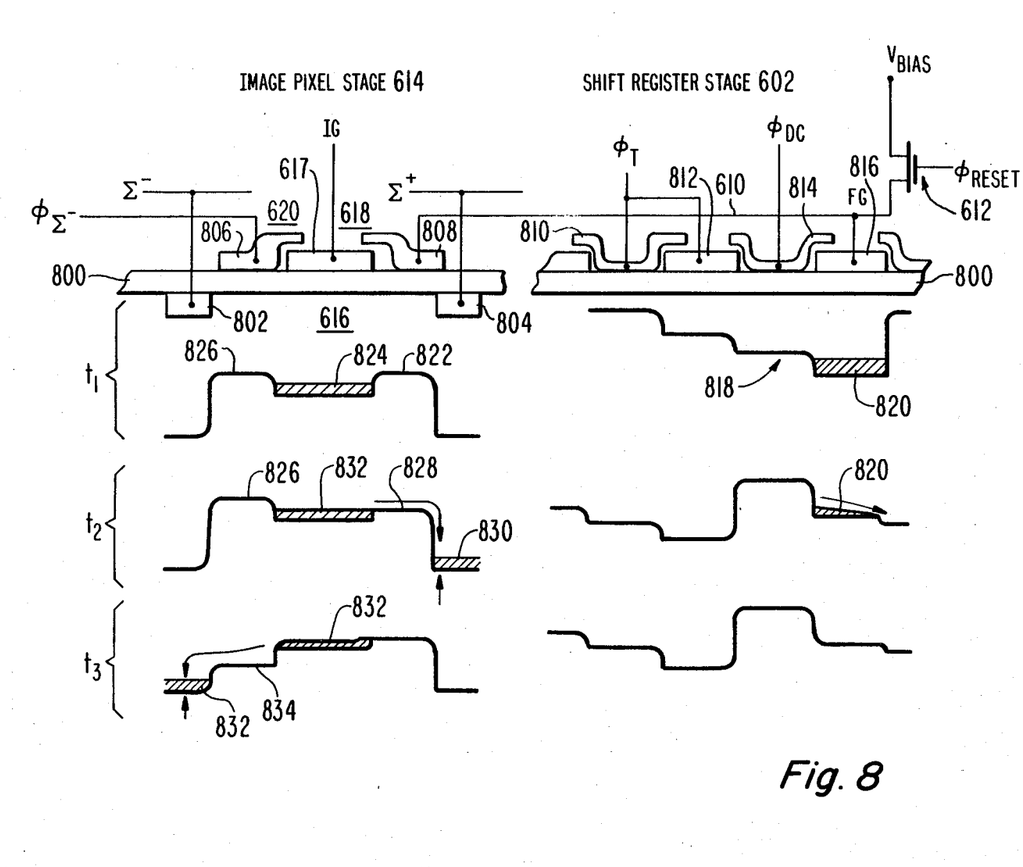
FIG. 8 is a cross-sectional view of a pixel stage and its corresponding shift register stage, together with substrate potential diagrams useful in explaining the operation thereof.

FIG. 8 shows the two-level structure of a CCD shift register stage 602 together with its associated pixel stage 614. Shift register stage 602 and pixel stage 614 includes a silicon oxide layer 800 covering the surface of a silicon substrate (not shown). However, the substrate includes floating diffusions 802 and 804 underlying oxide layer 800. Floating diffusion 802 of each pixel stage 614 is electrically connected to the $\Sigma-$ bus and floating diffusion 804 of each pixel stage 614 is electrically connected to the $\Sigma+$ bus. Imager pixel 616 of each pixel stage 614 is formed by the silicon substrate underlying first-level polysilicon layer IG exposure control integration gate 617. A second-level polysilicon layer gate electrode 806 forms the control electrode of $\Sigma-$ control gates 620. Similarly, a second-level polysilicon layer gate electrode 808 forms the control electrode of the $\Sigma+$ control gates 618. Gate electrode 806 is electrically connected to the common $\phi_{\Sigma-}$ bus and gate electrode 808 is electrically connected to floating gate FG 610.

Each shift register stage 602 includes first, second, third and fourth gate electrodes 810, 812, 814 and 816. The first and third gate electrodes 810 and 814 are formed of second-level polysilicon layers and the second and fourth gate electrodes 812 and 816 are formed of first-level polysilicon layers. First and second gate electrodes 810 and 812 of each shift register stage 602 are electrically connected to uniphase clock voltage bus $\phi_T$, third gate electrode 814 of each shift register stage 602 is electrically connected to the $\phi_{DC}$ bus and fourth gate electrode 816 is electricially connected to the floating gate FG conductor 610. It is assumed that some means (not illustrated) such as a dc offset or an ion implant beneath one of 810 and 812 to create the substrate potential asymmetry shown in FIG. 8 required for proper operation and suitable potentials are assumed to provide the necessary asymmetry for the substrate potentials beneath 814 and 816, as illustrated. FIG. 8 shows that $V_{BIAS}$ may be applied to FG conductor 610 when FET 612 is conducting, (i.e., during the photo-charge integration time period). During the integration time period, the analog reference weight charges are shifted into each shift register stage 602 in response to successive cycles of clock voltage $\phi_T$ applied to first and second gates 810 and 812 of each of shift register stages 602 of the serial-parallel shift register structure, described above in connection with FIG. 5.

Time $t_1$, shown in FIG. 8, occurs immediately after an integration time period, at the beginning of the $\phi_{RESET}$ pulse applied to FET 612 (so that FET 612 is non-conductive and the FG conductor 610 and fourth gate electrode 816 are floating). At time $t_1$, the potential levels under each of the respective gate electrodes 810, 812, 814 and 816 of each shift register stage 602 is that shown in timing diagram 818, which results in all of the analog reference weight charge 820 of that shift register stage 602 residing in the deepest potential well, which underlies floating gate 816. At time $t_1$, the potential level of floating gate FG on conductor 610 maintains gate electrode 808 of pixel stage 614 at a voltage level which produces a potential barrier 822 in the underlying substrate that is sufficient to prevent any of the accumulated integrated photo-charge 824 of imager pixel 616 from flowing to floating diffusion 804. Similarly, the potential level of $\phi_{\Sigma}-$ at time $t_1$ maintains gate electrode 806 which is common to all of the pixel stages 614, at a voltage level which produces a potential barrier 826 in the underlying substrate that is sufficient to prevent accumulated integrated photo-charge 824 of imager pixel 616 from flowing to floating diffusion 802.

However, in response to clock voltage $\phi_T$ going high, at time $t_2$, the analog reference weight charge 820 is transferred from under floating gate 816. This results in a positive change in the potential level of floating gate conductor FG 610 by an amount which is proportional to the amount of analog reference weight charge 820 stored in that shift register stage 602. This positive change in the potential level on floating gate FG conductor 610 is effective in reducing the potential barrier 822 to a level 828 which is still above the bottom of the potential well of imager pixel 616, but which is sufficiently low so that a fractional portion 830 of the accumulated integration photo-charge 824 can flow over the reduced barrier 828 to floating diffusion 804 during a short time interval which includes time $t_2$. This leaves a remaining fraction 832 of the accumulated photo-charge still stored in imager pixel 616. The size of the fractional portion 830 which flows to the floating diffusion 804 of each of the pixel stages 614 is determined by the amount of analog reference weight charge 820 of the shift register stage 602 associated therewith. However, the potential level of the common $\Sigma+$ bus is determined by the sum of the respective fractional portions of the charges 830 flowing to each of the floating diffusions 804 of all of the pixel stages 614 of the transversal filter.

At time $t_3$ (at which time clock voltage $\phi_T$ remains high), the potential level of $\phi_{\Sigma}-$ goes high (positive) by a sufficient amount to convert potential barrier 826 under gate electrode 806 into a potential well 834 having a depth which is deeper than the bottom of the imager pixel 616 potential well. Therefore, all of the remaining portion 832 of the accumulated imager pixel charge flows out of imager pixel 616 into floating diffusion 802 during a short time interval which includes time $t_3$, as indicated in FIG. 8. However, the potential level of the common $\Sigma-$ bus is proportional to the sum of the respective remaining charges 832 flowing to the floating diffusions 802 of all of the pixel stages 614 of the transversal filter.

Referring to FIG. 9, the subtractor 306 comprises differential amplifier 900 having the common $\Sigma+$ bus connected to the plus input thereof and the common $\Sigma-$ bus connected to the minus input thereof. The correlation output from subtractor 306 appears at the output of differential amplifier 900. FET 902 and FET 904, (both of which are controlled by $\phi_{SET}$ from Timing and Control 308), are respectively used to discharge the $\Sigma+$ and the $\Sigma-$ buses to the potential level of $V_{SET}$ at the end of each one of successive correlations. Differential amplifier 900 normally is external to the integrated circuit chip on which the monolithic Transversal Filter 300 and Shift Register Means 302 are contained. FET 902 and FET 904, alternativley, may be on the chip or may be external to the chip.

The electro-optical correlation means of the present invention, shown in FIGS. 3-9, has the capability of performing, in parallel, all of the large number of computations required to correlate an image pattern with a reference pattern. Such parallel operation permits all correlation computations to be achieved in a very short time. For instance, a time of 100 nanoseconds is all that is required to perform all the functions discussed above in connection with FIG. 8, together with an operation of subtractor 306 to produce a correlation output.

However, prior to computing a correlation, it is necessary to load the respective stages of Shift Register Means 302 with a set of analog reference weights defining a reference pattern, and also to accumulate photo-charge defining an image pattern.

In accordance with a first basic mode of operation of an electro-optical correlation means, different image patterns are successively correlated against a single reference pattern. In this case, the stages of Shift Register Means 302 need be loaded with the analog reference weights of the single reference pattern only once during an initial time period. However, an integration time period for accumulating photo-charge must occur before each successive correlation. The length of the initial period required to load Shift Register Means 302 depends upon the respective values of M and N. When both M and N are relatively large numbers (e.g., 128, by way of example), the initial period required to load Shift Register Means 302 with a reference pattern is much longer than the minimum charge integration time required to accumulate, in parallel, the pixel charges of an image pattern. For instance, an initial period of 1.28 milliseconds may be required to load all the stages of Shift Register Means 302 when the value of both M and N is 128. However, a minimum charge integration time (employing an image source of suitably high intensity) may be only 10 microseconds (although a somewhat longer charge integration time results in a higher signal-to-noise ratio image charge pattern). Therefore, successive correlations of different image patterns with a single reference pattern, each correlation involving 16,384 ($128^2$) multiplications and 16,384 additions—a total of 32,768 computations, can be accomplished every 10.1 microseconds (the sum of the 10 microsecond minimum charge integration time and the 100 nanosecond computation time), following the intial 1.28 millisecond period required to load the stages of Shift Register Means 302 with a set of analog weights defining the single reference pattern. The ability to make 32,768 calculations in a period of 10.1 microseconds is equivalent to a "flash" computation rate of 3.2 GHz per calculation (where "flash" computation rate is defined as the reciprocal of 10.1 $\mu$sec divided by 32,768).

In a second basic mode of operation of an electro-optical correlation means, a single image pattern is correlated against successive different reference patterns. Assuming again that both M and N are equal to 128, the time required for each of the successive correlations is limited by the relatively long time required to load the Shift Register Means 302 with a set of analog reference weights defining each different reference pattern. Therefore, if such loading time is 1.28 milliseconds, (which is orders of magnitude greater than the 10.1 microsecond minimum charge integration time and computation time), a single correlation of 32,768 calculations takes essentially 1.28 milliseconds, which is equivalent to a "flash" computation rate of only 25.6 MHz per calculation. However, even 25.6 MHz is vastly greater than the corresponding computation rate achievable by prior art electro-optical correlation means.

In summary, the present invention includes the following benefits:

(1) Monolithic implementation of both the imager and the programmable memory matrix functions (i.e., the prior art liquid crystal display function and the imager function are combined).

(2) There is a very short signal readout period, compared with a very long readout period for present CCD imager systems. There is a delay of only two CCD transfer times between the time that the image integration is completed and the matrix product/sum is available.

(3) The architecture allows "flash" computations at a rate substantially equal to the reciprocal of the minimum charge integration time.

(4) Photo charge may be accumulated while new matrix weights are serially read into the device. Computation capability is not lost due to the need to establish a new matrix of weights before imaging occurs.

(5) The photo charge encounters only one charge transfer to the output, thus there is no degradation in imaging performance due to charge transfer inefficiency in the signal readout.

(6) The architecture allows for pixel by pixel compensation for non-uniformity in photo response. Adjustments to the matrix (reference) weights allows for optical responsivity compensation.

(7) Capability to electrically introduce a uniform level of bias charge in all the image areas simultaneously.

(8) Concept applicable to visible light CCD imaging technology and to infrared CCD (Schottky-barrier) image technology.

What is claimed is:

1. In combination:
a monolithic electro-optical charge coupled device (CCD) transversal filter and analog reference weight CCD shift register means for said transversal filter;
said transversal filter being comprised of a predetermined number of pixel stages, each of which includes an imager pixel; and
said shift register means including a separate shift register stage corresponding to each one of said predetermined number of pixel stages, with each separate shift register stage being situated in cooperative relationship with its corresponding pixel stage, so that said shift register means can forward each of respective selected analog reference weight signals to the proper one of the respective pixel stages of said transversal filter, thereby to selectively control the filter characteristics of said transversal filter in accordance with said selected analog reference weight signals.

2. The combination defined in claim 1,
wherein each pixel stage includes a control gate coupled between the imager pixel of that pixel stage and a bus common to all the pixel stages of said transversal filter, said control gate of each pixel stage being responsive to the application thereto of an analog control signal pulse for transferring an amount of accumulated imager pixel charge of that pixel stage to said common bus that is determined by the amount by which the level of said accumulated imager pixel charge exceeds an adjustable threshold level that varies in accordance with the level of said applied analog control signal pulse; and means including each of the respective shift register stages for applying to the control gate of its corresponding pixel stage an analog control signal pulse having a level determined by said analog reference weight signal of that shift register stage.

3. The combination defined in claim 2,
wherein each pixel stage includes a second control gate coupled between the imager pixel of that pixel stage and a second bus common to all the pixel stages of said transversal filter, said second control gate of each pixel stage being responsive to the application thereto of a second control signal pulse, that occurs subsequent to the completion of the transfer said amount of accumulated imager pixel charge of that pixel stage to said common bus set forth in claim 2, for transferring all of any remaining accumulated imager-pixel charge of that pixel stage to said second common bus.

4. The combination defined in claim 3,
further comprising a subtractor for deriving an output signal substantially proportional to the difference between the total charge transferred from the imager pixels of all of said pixel stages to one of said common buses and the total charge transferred from the imager pixels of all of said pixel stages to the other of said common buses.

5. The combination defined in claim 4, wherein said one of said common buses is said common bus set forth in claim 2 and said other of said common buses is said second common bus.

6. The combination defined in claim 1,
wherein said predetermined number of pixel stages are arranged in a matrix of M rows and N columns, where M and N are plural integers; and
wherein said shift register means includes N parallel M-stage CCD shift registers, each of which M-stage shift registers is associated with a different one of said N columns of pixel stages, each stage of each of said M-stage shift registers being in cooperative relationship with a separate corresponding one of said pixel stages of that one of the N columns with which that M-stage shift register is associated.

7. The combination defined in claim 6,
wherein said shift register means further includes a single N-stage CCD shift register, each stage of which is associated with a different one of said N parallel M-stage shift registers so that said N-stage, shift register can be serially loaded with N analog reference weight signals that can be transferred in parallel by said parallel M-stage shift registers to the respective stages thereof corresponding to any selected one of said M rows of pixel stages.

8. Electro-optical correlation means comprising:
an electro-optical charge coupled device (CCD) transversal filter comprised of (1) a $\Sigma^+$ bus, (2) a $\Sigma^-$ bus, and (3) an imager array of pixel stages, each of said pixel stages including an imager pixel, said imager array deriving and storing a charge pattern at the end of an integration time period that corresponds to a radiant energy image incident on said imager array during said integration time period, every one of the pixel stages of said array further including first and second control gates, each of said first control gates being responsive to the presence of an analog control signal pulse applied thereto for transferring an amount of charge then stored by the imager pixel of its pixel stage to the same certain one of said $\Sigma+$ and $\Sigma-$ buses, said amount of transferred charge being substantially determined by the amount by which the charge then stored by that imager pixel exceeds an adjustable threshold level that varies in accordance with the level of the analog control signal pulse applied to the first control gate, each of said second control gates being responsive to the presence of another control pulse for transferring all the charge then stored by the imager pixel of its pixel stage to the same other one of said $\Sigma+$ and $\Sigma-$ buses at the time of occurrence of said other control pulse;

first means for applying said analog control signal pulse to the first control gate of each of the pixel stages of said array for a first interval subsequent to said integration time period, said first means including analog reference weight CCD shift register means having a separate shift register stage corresponding to each pixel stage of said array for selectively determining the respective levels of the analog control signal pulses applied respectively to the first control gate of each of the respective pixel stages;

second means for applying said other control pulse to the second control gate of each of the pixel stages of said array for a second interval subsequent to said first interval which second interval is of sufficient duration for all of the then-stored charge of an imager pixel to be transferred to said other one of said $\Sigma+$ and $\Sigma-$ buses for deriving a correlation output substantially proportional to the difference in the respective total charge transferred to each of said $\Sigma+$ and $\Sigma-$ buses.

9. The electro-optical correlation means defined in claim 8, wherein said certain one of said $\Sigma+$ and $\Sigma-$ buses is said $\Sigma+$ bus.

10. The electro-optical correlation means defined in claim 8, wherein said imager array is a two-dimensional imager array with said pixel stages being arranged in a matrix of M rows and N columns, where M and N are plural integers.

11. The electro-optical correlation means defined in claim 8, wherein said first means includes means for loading the respective shift register stages of said shift register means with a set of pre-selected analog reference weights during the occurrence of said integration time period.

12. An electro-optical correlator comprising, in combination:

a charge coupled device (CCD) comprising an array of pixels operating as an imager, said array being receptive of an image;

a plurality of charge reception means, equal in number to the number of pixels;

a like plurality of charge transfer control means, each for controlling the transfer of charge from a pixel to a corresponding one of said charge reception means;

means responsive to a reference image manifestation for setting each charge transfer means to an analog level representing the intensity of the reference image manifestation at the respective pixel locations, whereby at each pixel location an amount of charge transfers to the charge reception means for that pixel dependent on the level of charge present at a pixel and the analog level applied to the charge transfer means associated with that pixel;

a plus sum bus coupled to all charge reception means in which a voltage is induced proportional to the sum of the charges conveyed to all of said charge reception means;

a minus sum bus; and means responsive to the charges remaining in all of the pixels after the transfer of charges to all of said charge reception means for producing a voltage on said minus sum bus proportional to the sum of said remaining charges.

* * * * *